(12) United States Patent
Solomon et al.

(10) Patent No.: US 9,845,763 B2
(45) Date of Patent: Dec. 19, 2017

(54) METHOD FOR CONTROLLING AN INTERNAL COMBUSTION ENGINE

(71) Applicant: GM GLOBAL TECHNOLOGY OPERATIONS LLC, Detroit, MI (US)

(72) Inventors: Arun S. Solomon, Rochester Hills, MI (US); Ronald M. Otto, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 15/092,252

(22) Filed: Apr. 6, 2016

(65) Prior Publication Data

US 2016/0326978 A1 Nov. 10, 2016

Related U.S. Application Data

(60) Provisional application No. 62/157,705, filed on May 6, 2015.

(51) Int. Cl.

| F02D 41/00 | (2006.01) |
|---|---|
| F02D 41/40 | (2006.01) |
| F02D 41/24 | (2006.01) |
| F01N 3/20 | (2006.01) |
| F01N 3/021 | (2006.01) |
| F02D 41/30 | (2006.01) |
| F02P 5/04 | (2006.01) |

(Continued)

(52) U.S. Cl.
CPC ........... *F02D 41/405* (2013.01); *F01N 3/021* (2013.01); *F01N 3/2066* (2013.01); *F02D 41/2409* (2013.01); *F02D 41/402* (2013.01); *F02D 37/02* (2013.01); *F02D 41/3023* (2013.01); *F02D 2041/389* (2013.01); *F02P 5/045* (2013.01); *Y02T 10/24* (2013.01); *Y02T 10/44* (2013.01)

(58) Field of Classification Search
CPC ...... F02D 41/00; F02D 41/401; F02D 41/405; F02D 41/007; F02D 41/3011; F02D 2200/1002; F02D 2200/3406; Y02T 10/24; Y02T 10/44

See application file for complete search history.

(56) References Cited

U.S. PATENT DOCUMENTS

| 7,165,528 | B2* | 1/2007 | Ward | ...................... | F02B 23/08 123/301 |
|---|---|---|---|---|---|
| 7,441,537 | B2 | 10/2008 | Szekely, Jr. et al. | | |
| 7,484,494 | B2 | 2/2009 | Lippert et al. | | |

(Continued)

*Primary Examiner* — Hieu T Vo
(74) *Attorney, Agent, or Firm* — Quinn IP Law

(57) ABSTRACT

A fuel injection strategy and ignition timing for a spark-ignition direct fuel injection engine are selected in response to monitored engine load in relation to a plurality of load regions. This includes selecting a preferred ignition timing based upon the engine load, and selecting a first fuel injection event that is executed post-ignition, wherein the first fuel injection event delivers a set fuel mass at a preset timing relative to the preferred timing for the spark ignition event regardless of the engine load. A first pre-ignition fuel injection event is selected, and includes a second fuel mass being injected at a second fuel injection timing, wherein an end-of-injection timing of the first pre-ignition fuel injection event is at a preset timing relative to the preferred ignition timing regardless of the engine load, and wherein the second fuel mass is determined in relation to the engine load.

19 Claims, 3 Drawing Sheets

(51) Int. Cl.
*F02D 37/02* (2006.01)
*F02D 41/38* (2006.01)

(56) References Cited

U.S. PATENT DOCUMENTS

| | | | |
|---|---|---|---|
| 7,610,900 B2 | 11/2009 | Lippert et al. | |
| 8,146,555 B2 | 4/2012 | Solomon et al. | |
| 9,194,312 B2* | 11/2015 | Sugano | B60W 10/06 |
| 2017/0009698 A1* | 1/2017 | Tsugawa | F02D 41/401 |

* cited by examiner

METHOD FOR CONTROLLING AN INTERNAL COMBUSTION ENGINE

CROSS-REFERENCE TO RELATED APPLICATIONS

This application claims the benefit of U.S. Provisional Patent Application No. 62/157,705 filed on May 6, 2015, the disclosure of which is hereby incorporated by reference.

TECHNICAL FIELD

This disclosure relates to internal combustion engines and methods and apparatuses for their control.

BACKGROUND

Engine downsizing includes reducing engine displacement and quantity of engine cylinders to reduce weight, friction and pumping losses, while increasing engine operation in high-speed, high load operating regions to maintain performance in terms of power and efficiency. Known downsized engines employ intake air compressors to boost airflow, affecting engine knock and exhaust emissions. One known engine control strategy to reduce knock includes retarding combustion phasing by controlling spark ignition timing, with a corresponding decrease in engine efficiency. One known engine control strategy to manage NOx emissions includes operating at increased cylinder dilution with recirculated exhaust gas, with a corresponding risk of reduced combustion stability.

SUMMARY

A spark-ignition direct fuel injection internal combustion engine (engine) including an intake air compressor is described. A method of controlling the engine includes separating engine load into a plurality of separate, contiguous load regions ranging between a minimum load region and a maximum load region and monitoring engine load. A preferred fuel injection strategy and a preferred ignition timing are selected and executed for each cylinder event responsive to the monitored engine load in relation to the plurality of load regions. Selecting the preferred fuel injection strategy and preferred ignition timing for each cylinder event responsive to the monitored engine load in relation to the plurality of load regions includes selecting the preferred ignition timing based upon the engine load, and selecting a first fuel injection event that is executed post-ignition, wherein the first fuel injection event delivers a set fuel mass at a preset timing relative to the preferred timing for the spark ignition event regardless of the engine load. A first pre-ignition fuel injection event is selected, and includes a second fuel mass being injected at a second fuel injection timing, wherein an end-of-injection timing of the first pre-ignition fuel injection event is at a preset timing relative to the preferred ignition timing for the spark ignition event regardless of the engine load, and wherein the second fuel mass is determined in relation to the engine load.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
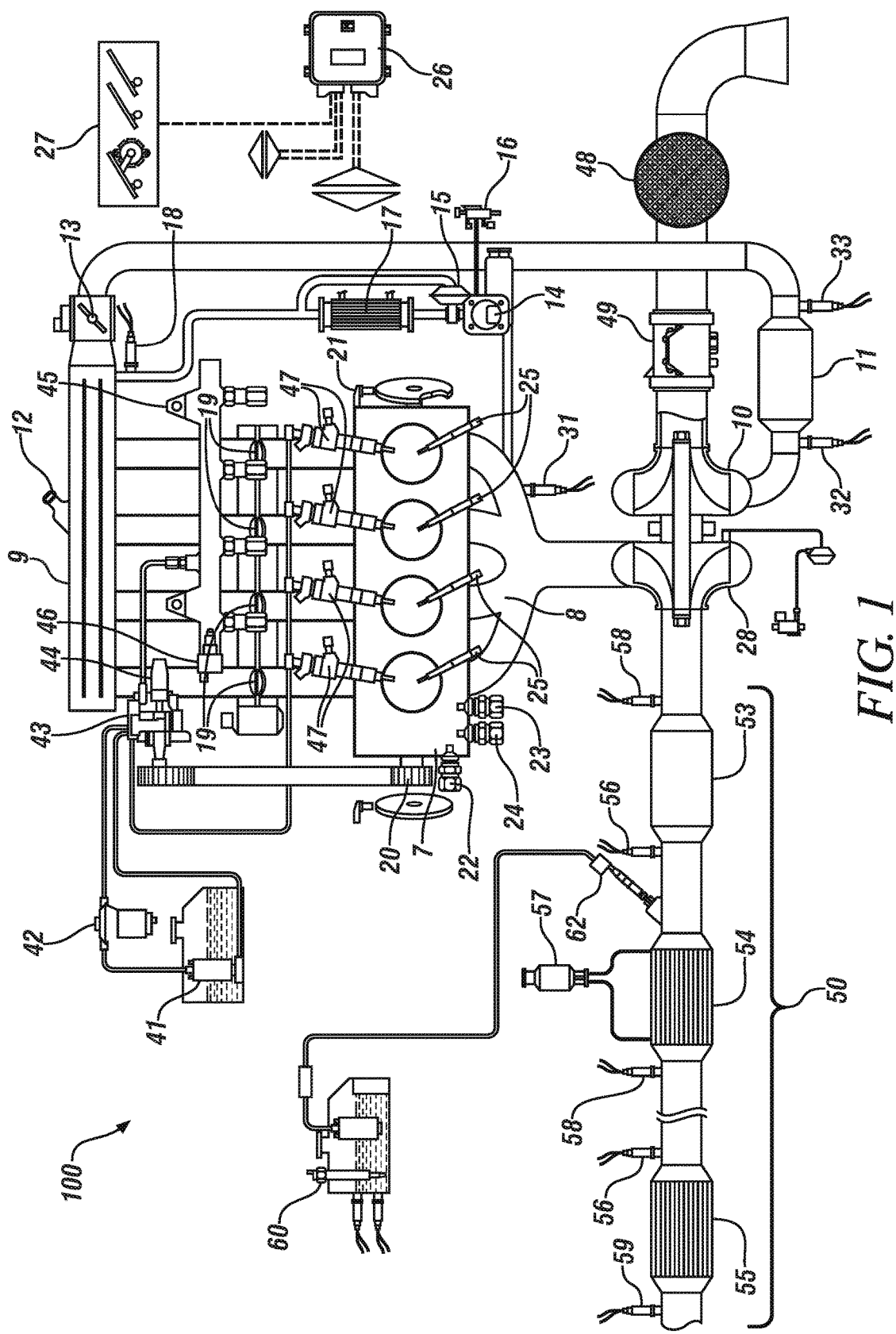
FIG. 1 schematically illustrates an internal combustion engine including an exhaust gas aftertreatment system, in accordance with the disclosure.

Referring now to the drawings, wherein the depictions are for the purpose of illustrating certain exemplary embodiments only and not for the purpose of limiting the same, FIG. 1 schematically illustrates an internal combustion engine (engine) 100 including an engine controller 26, and an exhaust aftertreatment system 50 that is arranged in accordance with an embodiment of this disclosure. The engine 100 is a multi-cylinder spark-ignition direct injection (SIDI) internal combustion engine that preferably employs an open combustion chamber geometry including high-squish bowl-in-piston piston, and includes a stratified-combustion charge operation in one embodiment. The engine control system controls fuel injection through rapid pulsing of fuel injectors 47. Multiple injection events within a given engine cycle are required to achieve delivery of the bulk of the fuel for mixing with air before the ignition event, which is followed by the short injection event to accurately and precisely deliver the small quantity of fuel after the initiation of the spark ignition event. The engine 100 is configured to operate with spark-ignition combustion as shown, although the concepts described herein may be employed on other engine configurations. The engine 100 may be employed on a ground vehicle, e.g., a passenger car, truck, agricultural vehicle or a construction vehicle, on a marine vehicle, or in a stationary setting, e.g., coupled to an electric power generator.

The engine 100 preferably includes a multi-cylinder engine block 7, an intake manifold 8 for channeling intake air to the cylinders of the engine 100, and an exhaust manifold 9 for entraining exhaust gas for channeling through the exhaust aftertreatment system 50. The engine 100 preferably operates in a four-stroke combustion cycle of repetitively-executed strokes of intake-compression-combustion-exhaust. A turbocharger, e.g., a variable geometry turbocharger (VGT) includes a turbine 28 that fluidly couples to the exhaust manifold 9 upstream of the exhaust aftertreatment system 50 and an intake air compressor 10 in one embodiment. Alternatively, the intake air compressor 10 may be an element of a supercharger, or another device that may be employed to increase intake air mass and airflow. The engine 100 includes a plurality of direct-injection fuel injectors 47 that are arranged to directly inject fuel into individual combustion chambers. The fuel injectors 47 may be any suitable direct-injection device, and are solenoidactivated devices in one embodiment. Alternatively, the fuel injectors 47 may be piezo-actuated devices in one embodiment. Fuel is supplied to the fuel injectors 47 from a fuel storage tank via a low-pressure fuel pump 41, a fuel filter assembly 42, a high-pressure fuel pump 43, a fuel metering valve 44 and a fuel rail 45 that employs a pressure regulating valve 46. Each of the engine cylinders preferably includes a spark plug 25 that is activated by an ignition module. Each spark plug 25 includes a tip portion inserted in the combustion chamber that includes an electrode and a cathode having a spark plug gap formed therebetween. The fuel injector 47 and the tip of the spark plug 25 are preferably placed in relative proximity to one another such that injected fuel interacts with the spark plug tip.

The engine 100 includes an intake air system, which may include an intake air filter 48, a mass air flow sensor 49, the intake air compressor 10, a charge air cooler 11, a throttle valve 13, a sensor 12 for monitoring boost pressure and intake air temperature, and other sensing devices as may be useful. The engine 100 may include an exhaust gas recirculation (EGR) system that fluidly channels exhaust gas from the exhaust manifold 9 to the intake manifold 8. In one embodiment, the EGR system may include an EGR valve 14, an EGR cooler 17 including a bypass valve 15, an EGR outlet temperature sensor 18, an EGR cooler inlet temperature sensor 31 and a vacuum switch 16. The intake manifold 8 may also include a plurality of swirl valves 19 for mixing intake air and the recirculated exhaust gas. Other engine monitoring sensors may include a crankshaft position sensor 20, a camshaft position sensor 21, a coolant temperature sensor 22, an oil level switch 23 and an oil pressure switch 24, among others. One or more engine monitoring sensors may be replaced with a suitable executable model.

Other unillustrated engine components and systems include pistons, crankshaft, cylinder head(s), intake valves, exhaust valves, camshaft(s), and variable cam phasers when employed. A cylinder head provides a mechanical structure for air intake ports, exhaust ports, intake valve(s), exhaust valve(s), the direct injection in-cylinder fuel injector 47, and the spark plugs 25. Other engine components, including intake and/or exhaust valve control mechanisms and schemes for variable cam phasing and variable valve actuation may be employed.

The engine controller 26 monitors various sensing devices and executes control routines to command various actuators to control operation of the engine 100 in response to operator commands. Operator commands may be determined from various operator input devices, including, e.g., a pedal assembly 27 that includes, by way of example, an accelerator pedal and a brake pedal. Other sensing devices associated with engine operation may include, by way of example only, a barometric pressure sensor, an ambient air temperature sensor, a VGT position sensor, the exhaust gas temperature sensor 31, an air charge inlet temperature sensor 32 and an air charge outlet temperature sensor 33, among others.

The exhaust aftertreatment system 50 may include a plurality of fluidly connected exhaust purifying devices for purifying engine exhaust gas prior to expulsion to ambient air. An exhaust purifying device may be any device configured to oxidize, reduce, filter or otherwise treat constituents of the exhaust gas feedstream, including but not limited to hydrocarbons, carbon monoxide, nitrides of oxygen (NOx), and particulate matter. Such exhaust purifying devices may include an oxidation catalyst 53, a particulate filter 54 and a selective catalyst reduction device (SCR) 55, which may be supplied with reductant from a reductant delivery system 60 including an injection nozzle 62 positioned in the exhaust gas feedstream upstream thereto. In one embodiment, the SCR 55 is a urea-based device, and the injected reductant is urea. When the engine 100 is employed on a ground vehicle, the oxidation catalyst 53 may be closely coupled to the exhaust manifold 9 and located within an engine compartment, and the particulate filter 54 may be closely coupled to the oxidation catalyst 53 with the SCR 55 downstream in an underfloor location. The embodiment shown includes the elements of the exhaust aftertreatment system 50 in one arrangement, which is illustrative. In one alternative arrangement, the particulate filter 54 may be arranged upstream of the oxidation catalyst 53. In one embodiment, the particulate filter 54 and the oxidation catalyst 53 may be collocated on a single substrate and/or collocated in a single mechanical assembly. Other arrangements of the elements of the exhaust aftertreatment system 50 may be employed within the scope of this disclosure, with such arrangements including addition of other exhaust purifying devices and/or omission of one or more of the exhaust purifying devices, depending upon exhaust purification requirements of the specific application.

Sensors for monitoring the exhaust purifying devices of the exhaust aftertreatment system 50 preferably include an exhaust gas sensor 58, a particulate matter sensor 56, and a delta pressure sensor 57 for monitoring pressure drop across the particulate filter 54, a temperature sensor 59, and/or other suitable sensing devices and models for monitoring the exhaust gas feedstream. The exhaust gas sensor 58 may be an engine-out NOx sensor, a wide-range lambda sensor, or another suitable exhaust gas sensing device. Such sensors and models may be arranged to monitor or otherwise determine parameters associated with performance of individual ones of the exhaust purifying devices, monitor parameters associated with performance of a subset of the exhaust purifying devices, or monitor parameters associated with performance of the overall exhaust aftertreatment system 50. The exhaust gas sensor 58 is preferably arranged to monitor the exhaust gas feedstream upstream of the oxidation catalyst 53. Alternatively or in addition the exhaust gas sensor 58 may be arranged to monitor the exhaust gas feedstream downstream of the oxidation catalyst 53.

The exhaust gas sensor 58 may be fabricated as a planar-type zirconium oxide dual cell device having a sensing element and an integrated electrically-powered heating element. A heater controller electrically connects to the heating element of the exhaust gas sensor 58 to control electrical power thereto. The heater controller controls electric power to the heating element to maintain the temperature of the sensing element of the exhaust gas sensor 58 within a predetermined temperature range. The heater controller controls electric power to the heating element employing any suitable voltage control routine, including, e.g., a pulsewidth-modulated control routine. During initial engine operation, the heater controller controls electric power to the heating element in a manner that limits thermal shock to the exhaust gas sensor 58 that may be caused by impingement of water or other liquids present in the exhaust gas feedstream. This may be referred to as a condensation water phase of operation.

The engine controller is operatively connected to the internal combustion engine 100, and includes one or a plurality of instruction sets that are executable to control operation as described herein. Engine control preferably includes controlling various engine operating parameters, including controlling preferred engine control states to minimize various exhaust gas constituents through chemical reaction processes that include, by way of non-limiting examples, oxidation, reduction, filtering, and selective reduction. Other engine control states include controlling operating parameters to warm-up the engine 100 and transfer heat or otherwise warm up various ones of the exhaust purifying devices of the aftertreatment system 50 in a timely fashion so as to rapidly effect their operation, thus minimizing cold-start emissions.

As described in detail with reference to FIG. 2, injecting fuel includes timing injection of the first fuel pulse or pulses that achieves a preferred fuel/air mixture preparation in the combustion chamber. The preferred fuel/air mixture typically comprises a fuel pulse of sufficient mass to power the engine to meet the operator torque demands, balanced against engine operation which meets emissions and smoke requirements and combustion stability. Igniting the spark plug preferably including selecting an ignition timing that achieves a mean-best-torque (MBT) of the engine under engine operating conditions, or another spark timing that maximizes engine torque and combustion stability while minimizing exhaust emissions. Spark timing is typically determined based upon a predetermined engine calibration which takes into account the engine operating conditions including engine speed and load, coolant temperature, EGR fraction, and others. Alternatively, when the engine is initially operating after a cold start, the ignition timing can be retarded from a warmed-up operating point to effect rapid heat-up and light-off of components of the exhaust aftertreatment system. Injecting fuel immediately after initiating the ignition event substantially improves repeatability and robustness of early flame kernel development in the combustion chamber. The described injection event improves air-fuel mixture conditions at the spark plug gap location during the early stages of the combustion process. This, in turn, improves overall repeatability and robustness of the entire combustion process, resulting in smooth, consistent engine operation as measured by such parameters as coefficient of variation of indicated mean effective pressure (COV-IMEP).

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communications bus link, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' and related terms describe steps or processes that are executed in real-time and are characterized by monitoring or otherwise determining states of parameters and regularly or periodically updating the states of the parameters during execution of a routine or between iterations of execution of the routine. In one embodiment, this includes as follows.

Figure 2:
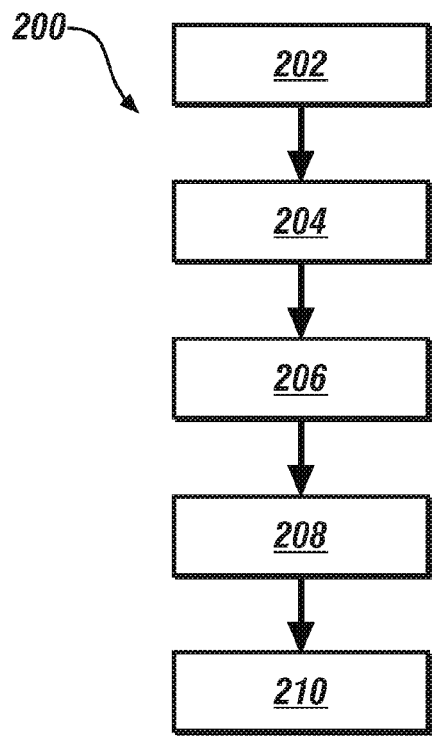
FIG. 2 schematically illustrates an engine fuel control routine employing an embodiment of the engine described with reference to FIG. 1, in accordance with the disclosure.

FIG. 2 schematically shows a fuel control routine 200 employing an embodiment of the engine 100 described hereinabove. The fuel control routine 200 is preferably periodically executed by the engine controller 26 as one or more instruction sets and accompanying calibrations during engine operation. Table 1 is provided as a key wherein the numerically labeled blocks and the corresponding functions are set forth as follows, corresponding to the fuel control routine 200.

TABLE 1

| BLOCK | BLOCK CONTENTS |
|---|---|
| 202 | Monitor engine load |
| 204 | Identify engine load region |
| 206 | Select spark ignition timing |
| 208 | Select fuel injection strategy |
| 210 | Execute selected fuel injection strategy and spark ignition timing |

Engine load is defined as a demand for power from an exemplary engine, preferably expressed as a percentage of a maximum power capability of the engine.

During engine calibration and development, a maximum engine load may be determined and separated into a plurality of separate, contiguous load regions ranging between a minimum load region and a maximum load region. The load regions may be selected to correspond to specifics for an engine configuration as it relates to intake air management and control, including engine boosting with the intake air compressor 10, intake and exhaust valve phasing, selected combustion mode, e.g., stratified charge or homogeneous charge, and other factors.

The spark ignition timing (SPK_ADV) is preferably predetermined and selected to maximize engine torque and combustion stability while minimizing exhaust emissions of the engine, taking into account states of engine operating parameters including engine speed and load, coolant temperature and EGR fraction, among others. When the engine is initially operating after a cold start, the ignition timing may be retarded to effect rapid heat-up and light-off of components of the exhaust aftertreatment system. The fuel injection strategy associated with load comprehends fuel injection timing and fuel mass per injection.

Figure 3:
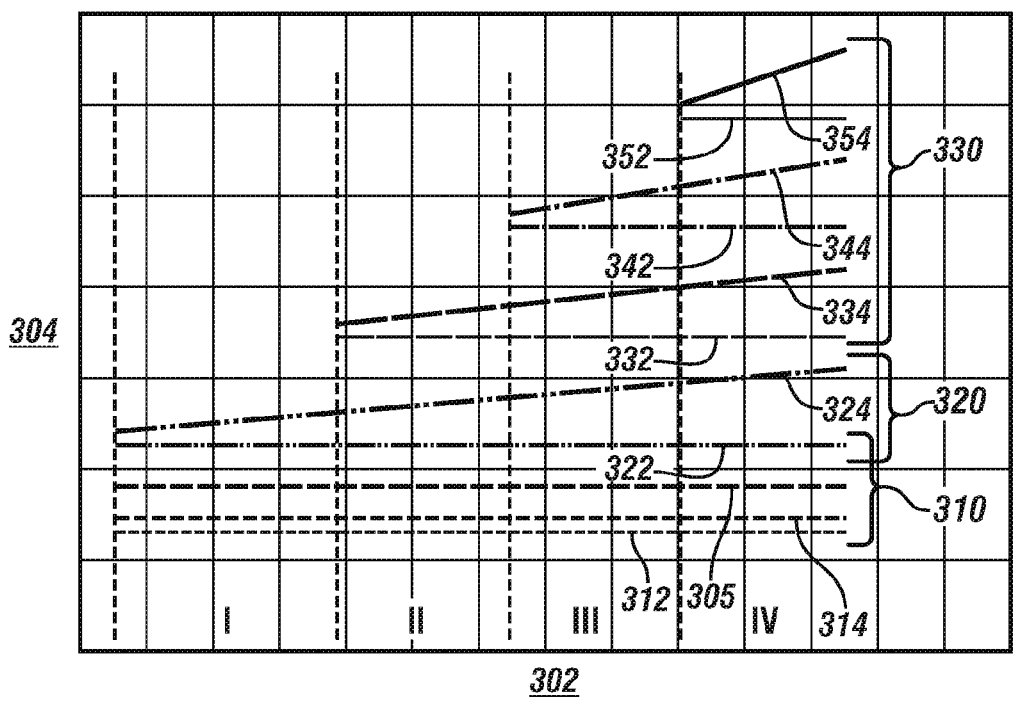
FIGS. 3 and 4 graphically show injection timing in relation to engine load for an exemplary engine operating with an embodiment of the fuel control routine, in accordance with the disclosure.
Figure 4:
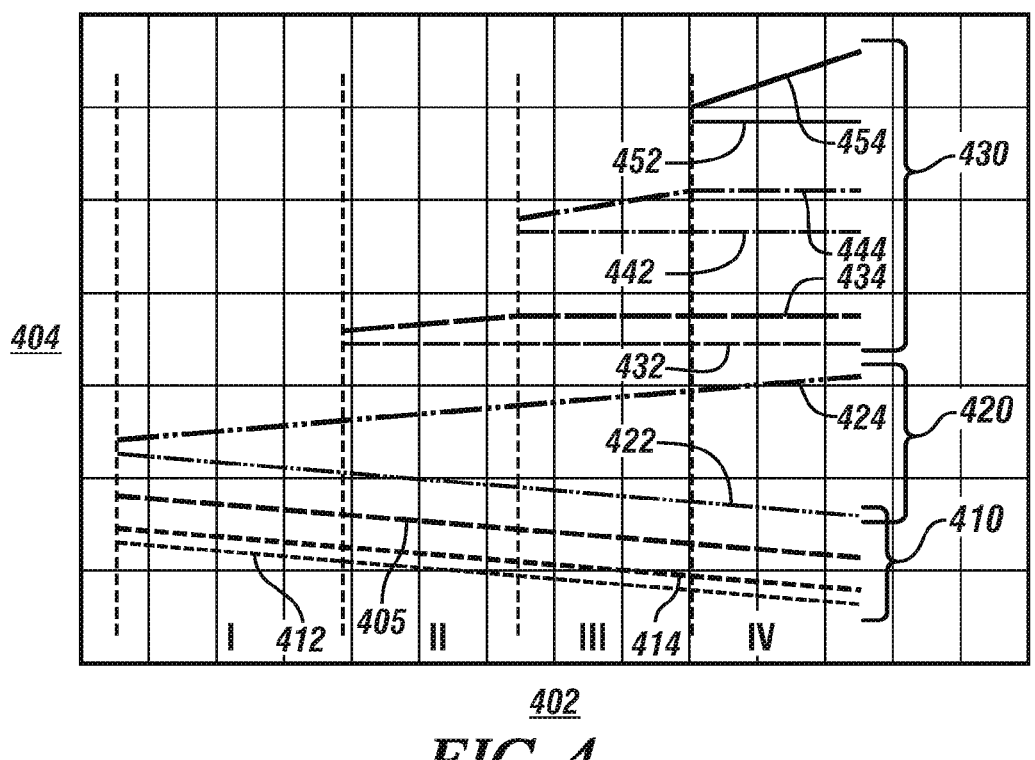

There may be four load regions in one embodiment, shown as Regions I, II, III and IV in both FIGS. 3 and 4, with Region I also referred to as the minimum load region and Region IV also referred to as the maximum load region. Other quantities of load regions may be selected. The minimum load region corresponds to engine operation with the intake air compressor 10 at a zero boost condition, with intake manifold pressure within a range of −50 to −100 kPa in one embodiment. The maximum load region corresponds to engine operation with the intake air compressor 10 at or near a full boost condition, e.g., with intake manifold pressure in a range of +150 to +200 kPa in one embodiment.

Engine operation in Region I preferably includes executing dual fuel injection events during each cylinder event, including a post-ignition fuel injection event and a first pre-ignition fuel injection event. Engine operation in Region II preferably includes executing three fuel injection events during each cylinder event, including the post-ignition fuel injection event and first pre-ignition fuel injection event from Region I, and a second pre-ignition fuel injection event. Engine operation in Region III preferably includes executing four fuel injection events during each cylinder event, including the post-ignition fuel injection event and first pre-ignition fuel injection event from Region I, the second pre-ignition fuel injection event from Region II, and a third pre-ignition fuel injection event from Region III. Engine operation in Region IV preferably includes executing five fuel injection events during each cylinder event, including the post-ignition fuel injection event and first pre-ignition fuel injection event from Region I, the second pre-ignition fuel injection event from Region II, and the third pre-ignition fuel injection event from Region III. Each of the fuel injection events is characterized and executed in terms of an injection timing and an injected fuel mass.

The post-ignition fuel injection event includes a first fuel mass Q1 and a first fuel injection timing EOI1. Timing for the post-ignition fuel injection event may be related to timing of end of injection (EOI) and determined in relation to the spark ignition timing (SPK_ADV), as follows:

$$EOI1 = SPK\_ADV - K1 \times G1(engine\_speed, engine\_load) \qquad [1]$$

The terms include engine-specific factors K1 and G1, wherein G1 is selected based upon the engine speed and engine load. Alternatively, timing for the post-ignition fuel injection event may be related to timing of start of injection (SOI) and determined in relation to the spark ignition timing (SPK_ADV).

The first fuel mass Q1 is preferably a constant value throughout the load regions.

$$Q1 = Qs = constant \qquad [2]$$

The post-ignition fuel injection event includes injecting the fuel immediately after initiating the ignition event to improve air-fuel mixture conditions at the spark plug gap location during the early stages of combustion. This operation is intended to improve overall repeatability and robustness of the entire combustion process, resulting in smooth, consistent engine operation as measured by such parameters as coefficient of variation of indicated mean effective pressure (COV-IMEP). This remains unchanged for each of the load regions.

The first pre-ignition fuel injection event is introduced during operation in the Region I load region and preferably includes a second fuel mass Q2 and a second fuel injection timing EOI2. Timing for the first pre-ignition fuel injection event may be related to timing of end of injection (EOI) and determined in relation to the spark ignition timing (SPK_ADV), as follows:

$$EOI2 = SPK\_ADV + K2 \times G2(engine\_speed, engine\_load) \qquad [3]$$

The terms include engine-specific factors K2 and G2, wherein G2 is selected based upon the engine speed and engine load. Alternatively, timing for the first pre-ignition fuel injection event may be related to timing of start of injection (SOI) and determined in relation to the spark ignition timing (SPK_ADV).

The second fuel mass Q2 is preferably dependent upon engine speed and load, and is determined using a scaling factor H2, as follows.

$$Q2 = H2(engine\_speed, engine\_load) \qquad [4]$$

Thus, the entire fuel mass injected during operation in Region I includes the first and second fuel masses Q1 and Q2. When the engine is operating outside of Region I, the first and second fuel masses Q1 and Q2 and the first and second fuel injection timings EOI1 and EOI2 are determined in relation to engine speed and load.

The second pre-ignition fuel injection event is introduced during engine operation in the Region II load region and preferably includes a third fuel mass Q3 and a third fuel injection timing EOI3. Timing for the second pre-ignition fuel injection event may be related to timing of end of injection (EOI) and determined in relation to the spark ignition timing (SPK_ADV), as follows:

$$EOI3 = C3 + K3 \times G3(engine\_speed, engine\_load) \qquad [5]$$

The terms include engine-specific factors C3, K3 and G3, wherein C3 and K3 are constants specific to the engine configuration and G3 is selected based upon the engine speed and engine load. Alternatively, timing for the second pre-ignition fuel injection event may be related to timing of start of injection (SOI) and determined in relation to the spark ignition timing (SPK_ADV).

The third fuel mass Q3 is preferably dependent upon engine speed and load, and is determined using a scaling factor H3, as follows.

$$Q3 = H3(engine\_speed, engine\_load) \qquad [6]$$

When the engine is operating in Regions III or IV, the first, second and third fuel masses Q1, Q2 and Q3 and the first, second and third fuel injection timings EOI1, EOI2 EOI3 are determined in relation to engine speed and load.

The third pre-ignition fuel injection event is introduced during engine operation in the Region III load region and preferably includes a fourth fuel mass Q4 and a fourth fuel injection timing EOI4. Timing for the third pre-ignition fuel injection event may be related to timing of end of injection (EOI) and determined in relation to the spark ignition timing (SPK_ADV), as follows:

$$EOI4 = C4 + K4 \times G4(engine\_speed, engine\_load) \qquad [7]$$

The terms include engine-specific factors C4, K4 and G4, wherein C4 and K4 are constants specific to the engine configuration and G4 is selected based upon the engine speed and engine load. Alternatively, timing for the fourth pre-ignition fuel injection event may be related to timing of start of injection (SOI) and determined in relation to the spark ignition timing (SPK_ADV).

The fourth fuel mass Q4 is preferably dependent upon engine speed and load, and is determined using a scaling factor H4, as follows.

$$Q4 = H4(engine\_speed, engine\_load) \qquad [8]$$

When the engine is operating in Region IV, the first, second, third and fourth fuel masses Q1, Q2, Q3 and Q4 and the first, second, third and fourth fuel injection timings EOI1, EOI2, EOI3 and EOI4 are determined in relation to engine speed and load.

The fourth pre-ignition fuel injection event is introduced during engine operation in the Region IV load region and preferably includes a fifth fuel mass Q5 and a fifth fuel injection timing EOI5. Timing for the fourth pre-ignition fuel injection event may be related to timing of end of injection (EOI) and determined in relation to the spark ignition timing (SPK_ADV), as follows:

$$EOI5 = C5 + K5 \times G5(\text{engine\_speed}, \text{engine\_load}) \quad [9]$$

The terms include engine-specific factors C5, K5 and G5, wherein C5 and K5 are constants specific to the engine configuration and G5 is selected based upon the engine speed and engine load. Alternatively, timing for the fifth pre-ignition fuel injection event may be related to timing of start of injection (SOI) and determined in relation to the spark ignition timing (SPK_ADV).

The fifth fuel mass Q5 is preferably dependent upon engine speed and load, and is determined using a scaling factor H5, as follows.

$$Q5 = H5(\text{engine\_speed}, \text{engine\_load}) \quad [10]$$

When the engine is operating in Region IV, the first, second, third and fourth fuel masses Q1, Q2, Q3 and Q4 and the first, second, third and fourth fuel injection timings EOI1, EOI2, EOI3 and EOI4 are determined in relation to engine speed and load.

As such, the fuel masses, e.g., first, second, third, fourth and fifth fuel masses Q1, Q2, Q3, Q4 and Q5 are selected in relation to engine load, with the first fuel mass Q1 being set to a constant, small quantity of fuel, on the order of 1 mg, for the entire load range. The second fuel mass Q2 is selected to gradually deliver increasing quantities of fuel with increasing engine load. The second fuel mass Q2 serves to control engine load and engine knock.

The third fuel mass Q3 is selected to gradually deliver increasing quantities of fuel with increasing engine load. The third fuel mass Q3 and subsequent fuel masses, e.g., the fourth fuel mass Q4 and the fifth fuel mass Q5, serve to control smoke emissions.

The fuel control routine 200 described herein that includes controlling the timing and quantity of multiple injection events in response to engine load may improve combustion performance of boosted dilute SIDI combustion engines, by suppressing engine knock, increasing thermal efficiency, and reducing engine combustion variability by selecting a preferred fuel injection strategy and a preferred ignition timing for each cylinder event responsive to the monitored engine load in relation to the plurality of load regions.

FIG. 3 graphically shows Injection Timing (°bTDC) 304 in relation to Engine Load (kPa) 302 for an exemplary engine operating with an embodiment of the fuel control routine 200 described herein. Such timing is shown in relation to spark advance timing 305, which is unchanged as shown. The graph indicates the injection pulses that are associated with combustion stability control 310, knock control 320, and smoke control 330 for each of four engine load regions, i.e., Regions I, II, III and IV. The operation includes a first fuel injection event including timing for a first start-of-injection (SOI) 314 and timing for a first end-of-injection (EOI) 312, timing for a second SOI 324 and timing for a second EOI 322, timing for a third SOI 334 and timing for a third EOI 332, timing for a fourth SOI 344 and timing for a fourth EOI 342, and timing for a fifth SOI 354 and timing for a fifth EOI 352. The first EOI 312, second SOI 324, third SOI 334, fourth SOI 344 and fifth SOI 354 are all at fixed timing points in relation to the spark advance 305 over the entire range of engine load, and the second EOI 322, third EOI 332, fourth EOI 342 and fifth EOI 352 are increasing with increasing load. The first EOI 312 is a set timing because the first fuel mass Q1 is preferably set to a constant, small quantity of fuel for the entire load range.

FIG. 4 graphically shows Injection Timing (°bTDC) 404 in relation to Engine Load (kPa) 402 for an exemplary engine operating with an embodiment of the fuel control routine 200 described herein. Such timing is shown in relation to spark advance timing 405, which decreases with increased load as shown. The graph indicates the injection pulses that are associated with combustion stability control 410, knock control 420, and smoke control 430 for each of four engine load regions, i.e., Regions I, II, III and IV. The operation includes a first fuel injection event including timing for a first start-of-injection (SOI) 414 and timing for a first end-of-injection (EOI) 412, timing for a second SOI 424 and timing for a second EOI 422, timing for a third SOI 434 and timing for a third EOI 432, timing for a fourth SOI 444 and timing for a fourth EOI 442, and timing for a fifth SOI 454 and timing for a fifth EOI 452. The first SOI 414 and the second EOI 422 are at fixed timing points in relation to the spark advance 405 over the entire range of engine load. The third EOI 432, fourth EOI 442 and fifth EOI 452 are at fixed timing points in relation to TDC over the entire range of engine load. The third SOI 434, fourth SOI 444 and fifth SOI 454 are increasing with increasing load.

Figure 5:
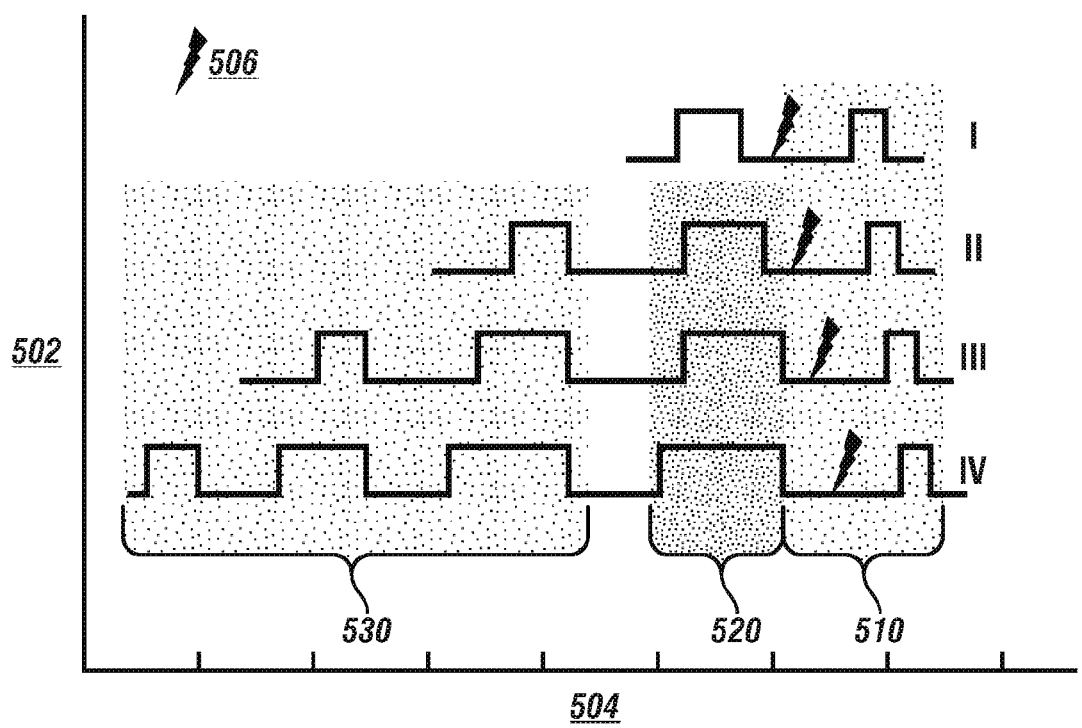
FIG. 5 graphically shows injection pulses in relation to engine crank angle for an exemplary engine operating with an embodiment of the fuel control routine described herein in each of the four load regions, in accordance with the disclosure.

FIG. 5 graphically shows Injection Pulses 502 in relation to engine crank angle (deg. bTDC) 504 for an exemplary engine operating with an embodiment of the fuel control routine 200 described herein in each of the four load regions, shown as Regions I, II, III and IV. The injection pulses are shown in relation to ignition timing 506. The graph indicates the injection pulses that are associated with combustion stability control 510, knock control 520, and smoke control 530 for each of four engine load regions, i.e., Regions I, II, III and IV. The various operations indicate that fuel control related to smoke control occurs at higher loads, i.e., during operation in Regions III and IV, Fuel control related to knock control occurs at all the loads, but is emphasized at higher loads including Regions II, III and IV. Fuel control related to combustion stability occurs at all the loads.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A multi-cylinder spark-ignition direct injection (SIDI) internal combustion engine, comprising:
a plurality of direct-injection fuel injectors that are arranged to inject fuel into individual cylinders of the engine;
a plurality of spark plugs including tip portions that are inserted into the individual cylinders of the engine;
an engine controller operatively connected to the fuel injectors and the spark plugs and in communication with a plurality of engine sensors, the engine controller including instruction sets, the instruction sets executable to:

separate engine load into a plurality of separate, contiguous load regions ranging between a minimum load region and a maximum load region;

monitor engine load;

select a preferred fuel injection strategy and a preferred ignition timing for each cylinder event responsive to the monitored engine load in relation to the plurality of load regions; and execute the selected preferred fuel injection strategy and preferred ignition timing for the cylinder event;

wherein the preferred fuel injection strategy and preferred ignition timing for each cylinder event are selected responsive to the monitored engine load in relation to the plurality of load regions, including:

select a preferred timing for a spark ignition event based upon the load;

select a post-ignition fuel injection event including a first fuel mass being injected at a first fuel injection timing;

select a first pre-ignition fuel injection event including a second fuel mass being injected at a second fuel injection timing, wherein the first pre-ignition fuel injection event is proximal to the spark ignition event when the engine load falls within the minimum load region;

add a second pre-ignition fuel injection event including a third fuel mass being injected at a third fuel injection timing, wherein the second pre-ignition fuel injection event occurs prior to the first pre-ignition fuel injection event when the engine load falls within a second of the load regions greater than the minimum load region;

add a third pre-ignition fuel injection event including a fourth fuel mass being injected at a fourth fuel injection timing, wherein the third pre-ignition fuel injection event occurs prior to the second pre-ignition fuel injection event when the engine load falls within a third of the load regions greater than the second load region; and add a fourth pre-ignition fuel injection event including a fifth fuel mass being injected at a fifth fuel injection timing, wherein the fourth pre-ignition fuel injection event occurs prior to the third pre-ignition fuel injection event when the engine load falls within a fourth of the load regions greater than the third load region.

2. The internal combustion engine of claim 1, further comprising an intake air compressor, wherein the minimum load region corresponds to engine operation with the intake air compressor at a zero boost condition, and wherein the maximum load region corresponds to engine operation with the intake air compressor near a full boost condition.

3. A method for controlling a spark-ignition, direct fuel injection internal combustion engine, the method comprising:

separating engine load into a plurality of separate, contiguous load regions ranging between a minimum load region and a maximum load region;

monitoring engine load;

selecting a preferred fuel injection strategy and selecting a preferred ignition timing for each cylinder event responsive to the monitored engine load and in relation to the plurality of load regions; and executing the selected preferred fuel injection strategy and executing a spark ignition event at the preferred ignition timing for each cylinder event;

wherein selecting the preferred fuel injection strategy and preferred ignition timing for each cylinder event responsive to the monitored engine load in relation to the plurality of load regions includes:

selecting the preferred ignition timing based upon the engine load, selecting a first fuel injection event that is executed post-ignition, wherein the first fuel injection event delivers a set fuel mass at a preset timing relative to the preferred timing for the spark ignition event regardless of the engine load, and selecting a first pre-ignition fuel injection event including a second fuel mass being injected at a second fuel injection timing, wherein an end-of-injection timing of the first pre-ignition fuel injection event is at a preset timing relative to the preferred ignition timing for the spark ignition event regardless of the engine load, and wherein the second fuel mass is determined in relation to the engine load.

4. The method of claim 3, further comprising adding a second pre-ignition fuel injection event including a third fuel mass being injected at a third fuel injection timing, wherein the second pre-ignition fuel injection event occurs prior to the first pre-ignition fuel injection event when the engine load falls within a second of the load regions that is greater than the minimum load region.

5. The method of claim 4, further comprising adding a third pre-ignition fuel injection event including a fourth fuel mass being injected at a fourth fuel injection timing, wherein the third pre-ignition fuel injection event occurs prior to the second pre-ignition fuel injection event when the engine load falls within a third of the load regions that is greater than the second load region.

6. The method of claim 5, further comprising adding a fourth pre-ignition fuel injection event including a fifth fuel mass being injected at a fifth fuel injection timing, wherein the fourth pre-ignition fuel injection event occurs prior to the third pre-ignition fuel injection event when the engine load falls within a fourth of the load regions that is greater than the third load region.

7. The method of claim 6, wherein the fourth load region comprises the maximum load region.

8. The method of claim 7, wherein the third fuel mass is a constant value during engine operation in the third and fourth load regions.

9. The method of claim 7, wherein the fourth fuel mass is a constant value during engine operation in the fourth load region.

10. The method of claim 6, wherein selecting timings of one of the first, second, third and fourth fuel injection events comprises selecting timings of end-of-injections for the corresponding one of the first, second, third and fourth fuel injection events.

11. The method of claim 6, wherein selecting timings of one of the first, second, third and fourth fuel injection events comprises selecting timings of start-of-injections for the corresponding one of the first, second, third and fourth fuel injection events.

12. The method of claim 3, wherein selecting the first pre-ignition fuel injection event further comprises selecting the timing of the second fuel injection event based upon combustion stability.

13. The method of claim 3, further comprising selecting the second fuel injection mass based upon the engine load and engine knock.

14. The method of claim 3, wherein adding the second pre-ignition fuel injection event comprises adding the third fuel mass injected at the third fuel injection timing based upon smoke generation.

15. The method of claim 3, wherein adding the third pre-ignition fuel injection event comprises adding the fourth fuel mass injected at the fourth fuel injection timing based upon smoke generation.

16. The method of claim 3, wherein adding the fourth pre-ignition fuel injection event comprises adding the fifth fuel mass injected at the fifth fuel injection timing based upon smoke generation.

17. A method for controlling a spark-ignition, direct fuel injection internal combustion engine that includes an intake air compressor, the method comprising:
- separating engine load into a plurality of separate, contiguous load regions ranging between a minimum load region and a maximum load region;
- monitoring engine load;
- selecting a preferred fuel injection strategy, wherein the preferred fuel injection strategy includes selecting a first pre-ignition fuel injection event including a second fuel mass being injected at a second fuel injection timing, wherein the first pre-ignition fuel injection event is proximal to the spark ignition event when the engine load falls within the minimum load region;
- selecting a preferred ignition timing for a spark ignition event for each cylinder event responsive to the monitored engine load;
- executing the selected preferred fuel injection strategy and the spark ignition event timing for each cylinder event;
- wherein selecting the preferred fuel injection strategy for each cylinder event responsive to the monitored engine load in relation to the plurality of load regions includes:
  - selecting a first fuel injection event that is executed post-ignition, wherein the first fuel injection event delivers a set fuel mass at a preset timing relative to the preferred timing for the spark ignition event regardless of the engine load, and
  - selecting a first pre-ignition fuel injection event including a second fuel mass being injected at a second fuel injection timing, wherein the second fuel mass is determined in relation to the engine load;
  - adding a second pre-ignition fuel injection event including a third fuel mass being injected at a third fuel injection timing, wherein the second pre-ignition fuel injection event occurs prior to the first pre-ignition fuel injection event when the engine load falls within a second of the load regions greater than the minimum load region;
  - adding a third pre-ignition fuel injection event including a fourth fuel mass being injected at a fourth fuel injection timing, wherein the third pre-ignition fuel injection event occurs prior to the second pre-ignition fuel injection event when the engine load falls within a third of the load regions greater than the second load region;
  - adding a fourth pre-ignition fuel injection event including a fifth fuel mass being injected at a fifth fuel injection timing, wherein the fourth pre-ignition fuel injection event occurs prior to the third pre-ignition fuel injection event when the engine load falls within a fourth of the load regions greater than the third load region.

18. The method of claim 17, wherein the minimum load region corresponds to engine operation with the intake air compressor at a zero boost condition.

19. The method of claim 17, wherein the maximum load region corresponds to engine operation with the intake air compressor near a full boost condition.

* * * * *